US010401516B2

United States Patent
Jiao et al.

(10) Patent No.: US 10,401,516 B2
(45) Date of Patent: Sep. 3, 2019

(54) TRAVEL-TIME OBJECTIVE FUNCTION FOR FULL WAVEFORM INVERSION

(71) Applicant: WESTERNGECO LLC, Houston, TX (US)

(72) Inventors: Kun Jiao, Katy, TX (US); Dong Sun, Katy, TX (US); Xin Cheng, Katy, TX (US); Denes Vigh, Houston, TX (US)

(73) Assignee: WESTERNGECO L.L.C., Houston, TX (US)

(*) Notice: Subject to any disclaimer, the term of this patent is extended or adjusted under 35 U.S.C. 154(b) by 156 days.

(21) Appl. No.: 15/521,592

(22) PCT Filed: Oct. 23, 2015

(86) PCT No.: PCT/US2015/057093
§ 371 (c)(1),
(2) Date: Apr. 24, 2017

(87) PCT Pub. No.: WO2016/065247
PCT Pub. Date: Apr. 28, 2016

(65) Prior Publication Data
US 2017/0242142 A1    Aug. 24, 2017

Related U.S. Application Data

(60) Provisional application No. 62/068,024, filed on Oct. 24, 2014.

(51) Int. Cl.
*G01V 1/30* (2006.01)
*E21B 49/02* (2006.01)
(Continued)

(52) U.S. Cl.
CPC ............ *G01V 1/305* (2013.01); *E21B 43/017* (2013.01); *E21B 43/30* (2013.01); *E21B 47/124* (2013.01);
(Continued)

(58) Field of Classification Search
CPC ................... G01V 1/305; G01V 1/282; G01V 2210/6222; G01V 2210/614; E21B 49/00;
(Continued)

(56) References Cited

U.S. PATENT DOCUMENTS 5,570,321 A * 10/1996 Bernitsas ............... G01V 1/282
367/38
5,838,634 A * 11/1998 Jones ..................... G01V 1/282
367/73

(Continued)

FOREIGN PATENT DOCUMENTS

WO    2011/031874 A1    3/2011

OTHER PUBLICATIONS

Bozdag, Misfit functions for full waveform inversion based on instantaneous phase and envelope measurements (Year: 2011).*
(Continued)

*Primary Examiner* — Mohammad K Islam
(74) *Attorney, Agent, or Firm* — Michael Guthrie

(57) ABSTRACT

Computing systems, computer-readable media, and methods for seismic processing. The method includes receiving seismic data including acquired seismic waveforms that were acquired from a seismic receiver and represent a subterranean area, generating synthetic waveforms based on an initial model of the subterranean area, determining a model error by minimizing a local travel time shift error between one or more of the acquired seismic waveforms and one or more of the synthetic waveforms, and adjusting the initial model based on the model error to generate an adjusted model.

12 Claims, 11 Drawing Sheets

(51) Int. Cl.
  *G01V 1/28* (2006.01)
  *E21B 49/00* (2006.01)
  *E21B 43/017* (2006.01)
  *E21B 43/30* (2006.01)
  *E21B 47/12* (2012.01)

(52) U.S. Cl.
  CPC .............. *E21B 49/00* (2013.01); *E21B 49/02* (2013.01); *G01V 1/282* (2013.01); *E21B 47/12* (2013.01); *G01V 2210/614* (2013.01); *G01V 2210/6222* (2013.01)

(58) Field of Classification Search
  CPC ........ E21B 49/02; E21B 47/124; E21B 43/30; E21B 43/017; E21B 47/12
  See application file for complete search history.

(56) References Cited

U.S. PATENT DOCUMENTS

| | | | | |
|---|---|---|---|---|
| 6,160,758 | A * | 12/2000 | Spiesberger | G01S 3/8006 342/378 |
| 2007/0203673 | A1* | 8/2007 | Sherrill | G01V 1/30 702/189 |
| 2007/0271041 | A1* | 11/2007 | Peng | G01V 1/28 702/14 |
| 2010/0332139 | A1* | 12/2010 | Bruun | G01V 1/282 702/18 |
| 2011/0000678 | A1* | 1/2011 | Krebs | G01V 1/282 166/369 |
| 2011/0090760 | A1* | 4/2011 | Rickett | G01V 1/282 367/73 |
| 2011/0096627 | A1* | 4/2011 | Hill | G01V 1/282 367/73 |
| 2011/0238390 | A1 | 9/2011 | Krebs et al. | |
| 2011/0255371 | A1* | 10/2011 | Jing | G01V 1/28 367/73 |
| 2011/0320180 | A1* | 12/2011 | Al-Saleh | G01V 1/303 703/6 |
| 2012/0073824 | A1* | 3/2012 | Routh | G01V 1/28 166/369 |
| 2012/0073825 | A1* | 3/2012 | Routh | G01V 1/28 166/369 |
| 2012/0232871 | A1* | 9/2012 | Priezzhev | G01V 7/00 703/10 |
| 2012/0259601 | A1 | 10/2012 | Fuck et al. | |
| 2012/0314538 | A1* | 12/2012 | Washbourne | G01V 1/30 367/49 |
| 2013/0297273 | A1* | 11/2013 | Altundas | G01V 1/282 703/10 |
| 2013/0311151 | A1 | 11/2013 | Plessix | |
| 2014/0052379 | A1* | 2/2014 | McVay | G01V 1/30 702/18 |
| 2014/0102694 | A1* | 4/2014 | Hargreaves | G01V 1/003 166/250.01 |
| 2014/0226437 | A1* | 8/2014 | Chambers | G01V 1/36 367/7 |
| 2014/0321713 | A1* | 10/2014 | Sava | G01V 1/303 382/109 |
| 2015/0081223 | A1* | 3/2015 | Williams | G01V 1/288 702/14 |
| 2015/0109885 | A1* | 4/2015 | Nowak | G01V 1/50 367/25 |
| 2015/0331123 | A1* | 11/2015 | Guigne | G01V 1/34 702/16 |
| 2016/0047924 | A1* | 2/2016 | Krohn | G01V 1/303 703/2 |
| 2016/0091622 | A1* | 3/2016 | Pei | G01V 1/28 702/11 |
| 2016/0097870 | A1* | 4/2016 | Routh | G01V 1/282 703/2 |
| 2016/0187512 | A1* | 6/2016 | Mothi | G01V 1/282 702/6 |

OTHER PUBLICATIONS

Lee et al. .Automating seismic waveform analysis for full 3-D waveform inversions, p. 572-589 (Year: 2013).*
Bozdag, Misfit functions for full waveform inversion based on instantaneous phase and envelope measurement (Year: 2011).*
International Preliminary Report on Patentability for the equivalent International patent application PCT/US2015/057039 dated May 4, 2017.
Bozdağ, et al., "Misfit functions for full waveform inversion based on instantaneous phase and envelope measurements," Geophysical Journal International, 2011, 185, pp. 845-870.
Bunks, et al., "Multiscale seismic waveform inversion," Geophysics, Sep. 1995, vol. 60, pp. 1457-1473.
Chavent, et al., "Automatic determination of velocities via migration-based traveltime waveform inversion: A synthetic data example." SEG Technical Program Expanded Abstracts 1994, pp. 1179-1182.
Clément, "MBTT inversion with a poor initial velocity background: Optimization strategies? Density of shots?" INRIA Technical Report 3657, retrieved on Apr. 19, 2017 at https://hal.inria.fr/inria-00073016/document.
Clément, et al., "Waveform inversion through MBTT formulation", INRIA Technical Report 1839, retrieved on Apr. 19, 2017 at https://hal.inria.fr/inria-00074833/document.
Delprat-Jannaud, et al., "A fundamental limitation for the reconstruction of impedance profiles from seismic data," Geophysics, Jan.-Feb. 2005, vol. 70, No. 1, pp. R1-R14.
Kennett, et al., "Subspace methods for large inverse problems with multiple parameter classes," Geophysical Journal International, Aug. 1988, vol. 94, Issue 2, pp. 237-247.
Luo, et al., "Wave-equation traveltime inversion," Geophysics, May 1991, vol. 56, No. 5, pp. 645-653.
Ma, et al., "Wave-Equation Reflection Traveltime Inversion with Dynamic Warping and Hybrid Waveform Inversion," SEG Houston 2013 Annual Meeting, pp. 871-876.
Plessix, et al., "Application of acoustic full waveform inversion to a low-frequency large-offset land data set," SEG Denver 2010 Annual Meeting, pp. 930-934.
Pratt, "Frequency-domain elastic wave modeling by finite differences: A tool for crosshole seismic imaging," Geophysics, vol. 55, No. 5, May 1990, pp. 626-632.
Pratt, et al., "Seismic waveform inversion in the frequency domain; part 2: Fault delineation in sediments using crosshole data," Geophysics, vol. 64, No. 3, May-Jun. 1999, pp. 902-914.
Tarantola, "Inversion of seismic reflection data in the acoustic approximation," Geophysics, vol. 49, No. 8, Aug. 1984, pp. 1259-1266.
Vigh, et al., "3D prestack plane-wave, full-waveform inversion," Geophysics, vol. 73, No. 5, Sep.-Oct. 2008, pp. VE135-VE144.
Clément, "A migration-based travel-time formulation for the inversion of 2D seismic reflection data." 1st Internat. Conf. on Mathematical and Numerical Aspects of Wave Propagation Phenomena, Ed. Cohen, et al. Proceedings of the 1st International Conference, France, Apr. 23-26, 1991 Chapter 45, pp. 455-461.
Lailly, P., "The Seismic Inverse Problem as a Sequence of Before Stack Migrations," in Conference on Inverse Scattering: Theory and Application, Eds Bednar, et al., A., Society for Industrial and Applied Mathematics, Philadelphia, PA, 1983, pp. 206-220.
Extended Search Report for the equivalent European patent application 15852925.5 dated Jun. 14, 2018.

* cited by examiner

TRAVEL-TIME OBJECTIVE FUNCTION FOR FULL WAVEFORM INVERSION

CROSS-REFERENCE TO RELATED APPLICATIONS

This application claims prior to U.S. Provisional Patent Application having Ser. No. 62/068,024, which was filed on Oct. 24, 2014 and is incorporated herein by reference in its entirety.

BACKGROUND

In seismic data processing, waveform inversion may be employed to determine a seismic model of a subterranean formation based on the characteristics of the seismic signals. One type of inversion is Full Waveform Inversion (FWI), which is based on full wave propagation. FWI may be used for refining detailed seismic velocity fields, which may then benefit migration techniques to achieve enhanced subsurface images.

Some algorithms employ FWI iteratively to update the subsurface earth models and reduce the misfit function. The misfit function generally measures the difference between the recorded seismic data and the simulated waveforms, such that the full waveform (primary, multiples, converted wave etc.) of acquired seismic data may be explained by the inverted subsurface earth models.

FWI misfit analysis may employ a mean-square difference between the observed/acquired data and simulated/calculated data. However, it may be challenging to find the minimum misfit, because one or more local minima may be present, which may not correspond to the global minimum. This may make adjusting the model to address the differences between the data challenging. Further, misfit analysis may be complicated by cycle-skipping between the predicted and observed data. One reason for such cycle-skipping is the observed data may lack low-frequency information because of physical realities in data acquisition and noise in the recorded seismic signal. To address this challenge, the quality of the starting or initial model in the vicinity of global minimum may be relevant. In another words, the background model or the low wave-number components of the model may need to be sufficiently accurate, a priori, in order to start FWI.

SUMMARY

The above deficiencies and other problems associated with processing of collected data are reduced or eliminated by the disclosed methods and systems.

Embodiments of the present disclosure may provide a method for seismic processing. The method includes receiving seismic data including acquired seismic waveforms that were acquired from a seismic receiver and represent a subterranean area, generating synthetic waveforms based on an initial model of the subterranean area, determining a model error by minimizing a local travel time shift error between one or more of the acquired seismic waveforms and one or more of the synthetic waveforms, and adjusting the initial model based on the model error to generate an adjusted model.

In an embodiment, determining the model error includes determining a travel time shift objective function in a time domain, wherein the travel time shift objective function represents a travel time shift between at least one of the acquired waveforms and at least one of the synthetic waveforms.

In an embodiment, determining the model error further includes determining a local travel time shift error.

In an embodiment, determining the local travel time shift error includes directly minimizing the travel shift objective function as a local attribute.

In an embodiment, determining the model error further includes translating the local travel time shift error to an unwrapped instantaneous phase error.

In an embodiment, determining the model error further includes determining an instantaneous phase objective function relation based on the unwrapped instantaneous phase error.

In an embodiment, determining the model error further includes back projecting the travel time shift error to the model error using the instantaneous phase objective function relation.

In an embodiment, the method further includes performing a full-waveform inversion using the adjusted model as a background model.

In an embodiment, the method further includes interpreting one or more characteristics of the subterranean formation based on a result of the full-waveform inversion.

Embodiments of the present disclosure may also provide a computing system including one or more processors and a memory system including one or more non-transitory, computer-readable media storing instructions that, when executed by at least one of the one or more processors, cause the computing system to perform operations. The operations include receiving seismic data including acquired seismic waveforms that were acquired from a seismic receiver and represent a subterranean area, generating synthetic waveforms based on an initial model of the subterranean area, determining a model error by minimizing a local travel time shift error between one or more of the acquired seismic waveforms and one or more of the synthetic waveforms, and adjusting the initial model based on the model error to generate an adjusted model.

Embodiments of the disclosure may also provide a non-transitory, computer-readable medium storing instructions that, when executed by at least one processor of a computing system, cause the computing system to perform operations. The operations include receiving seismic data including acquired seismic waveforms that were acquired from a seismic receiver and represent a subterranean area, generating synthetic waveforms based on an initial model of the subterranean area, determining a model error by minimizing a local travel time shift error between one or more of the acquired seismic waveforms and one or more of the synthetic waveforms, and adjusting the initial model based on the model error to generate an adjusted model.

Embodiments of the present disclosure may also include a computing system including at least one processor and means for receiving seismic data including acquired seismic waveforms that were acquired from a seismic receiver and represent a subterranean area, means for generating synthetic waveforms based on an initial model of the subterranean area, means for determining a model error by minimizing a local travel time shift error between one or more of the acquired seismic waveforms and one or more of the synthetic waveforms, and means for adjusting the initial model based on the model error to generate an adjusted model.

Thus, the computing systems and methods disclosed herein are more effective methods for processing collected data that may, for example, correspond to a subsurface region. These computing systems and methods increase data processing effectiveness, efficiency, and accuracy. Such methods and computing systems may complement or replace conventional methods for processing collected data. This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both, objects or steps, respectively, but they are not to be considered the same object or step.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

Figure 1A:
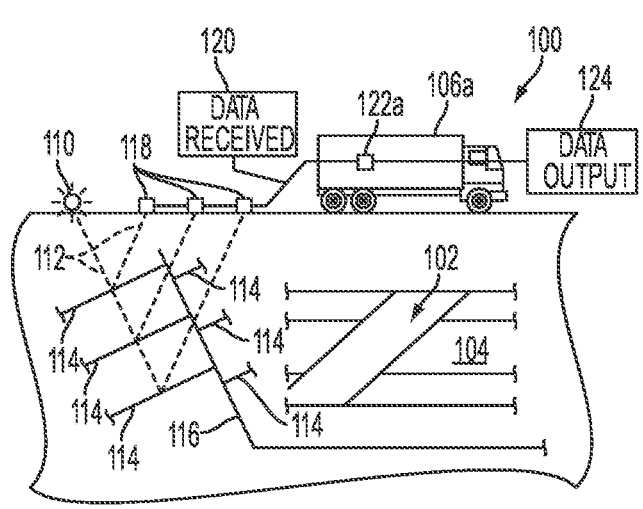
FIGS. 1A, 1B, 1C, 1D, 2, 3A, and 3B illustrate simplified, schematic views of an oilfield and its operation, according to an embodiment.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106.1, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

Figure 1B:
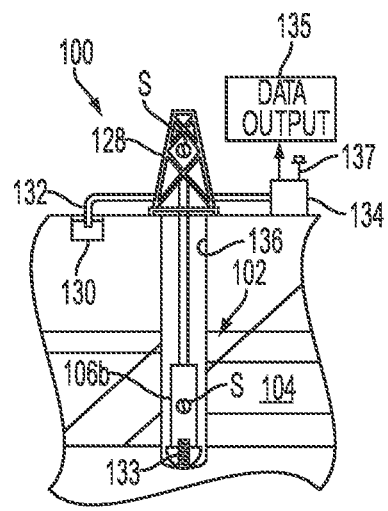

FIG. 1B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

Figure 1C:
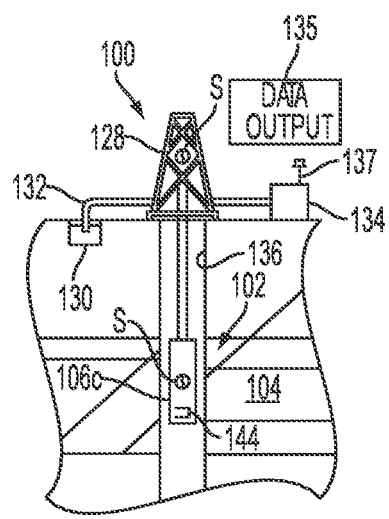

FIG. 1C illustrates a wireline operation being performed by wireline tool 106.3 suspended by rig 128 and into wellbore 136 of FIG. 1B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

Figure 1D:
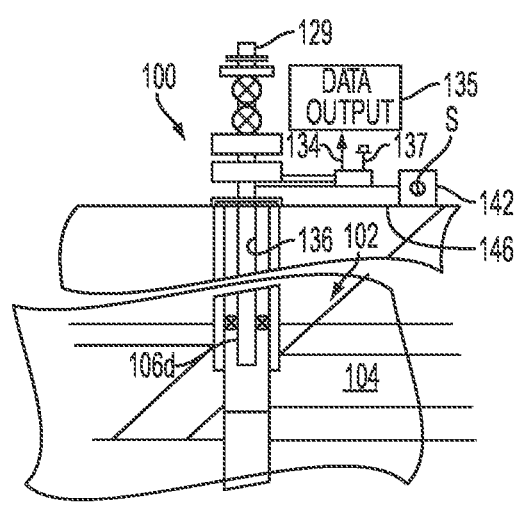

FIG. 1D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

Figure 2:
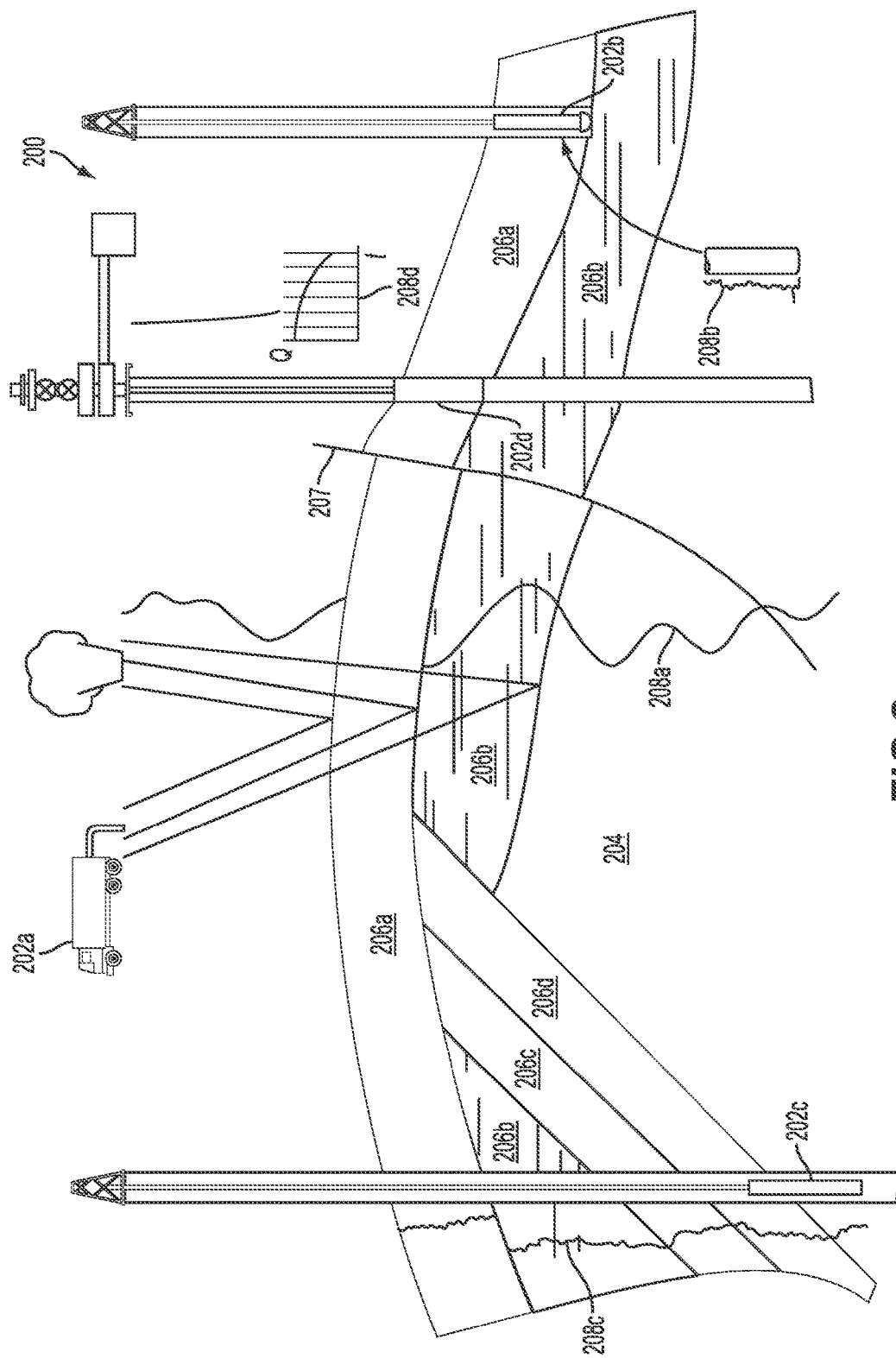

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1A-1D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively; however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that typically provides a resistivity or other measurement of the formation at various depths.

A production decline curve or graph 208.4 is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208.1 from data acquisition tool 202.1 is used by a geophysicist to determine characteristics of the subterranean formations and features. The core data shown in static plot 208.2 and/or log data from well log 208.3 are typically used by a geologist to determine various characteristics of the subterranean formation. The production data from graph 208.4 is typically used by the reservoir engineer to determine fluid flow reservoir characteristics. The data analyzed by the geologist, geophysicist and the reservoir engineer may be analyzed using modeling techniques.

Figure 3A:
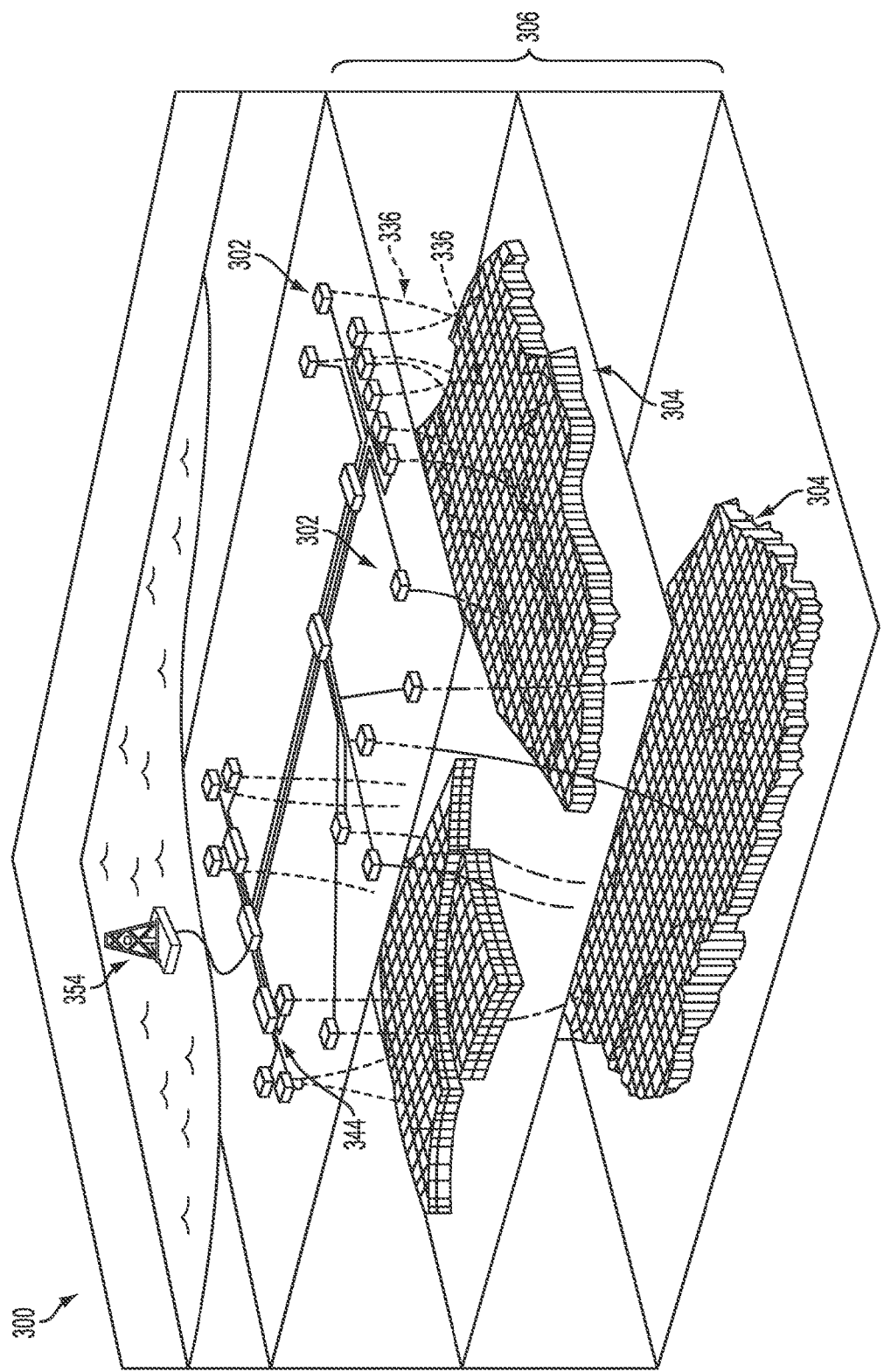

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
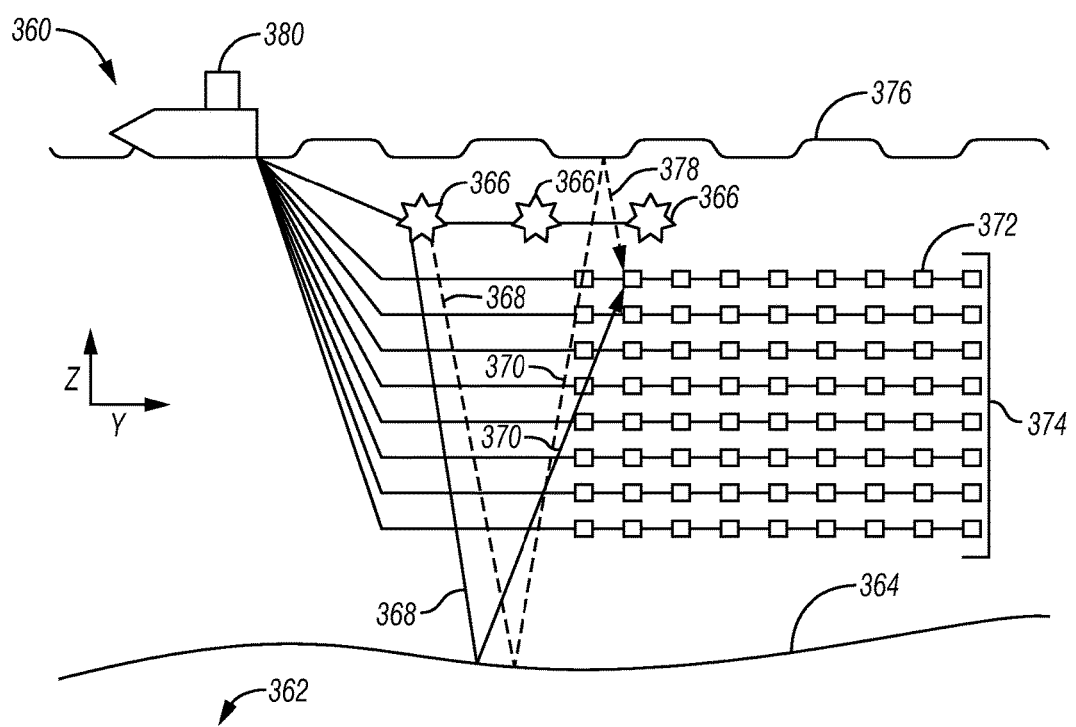

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Typically, marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Adjustive Full Waveform Inversion (FWI)

Figure 4:
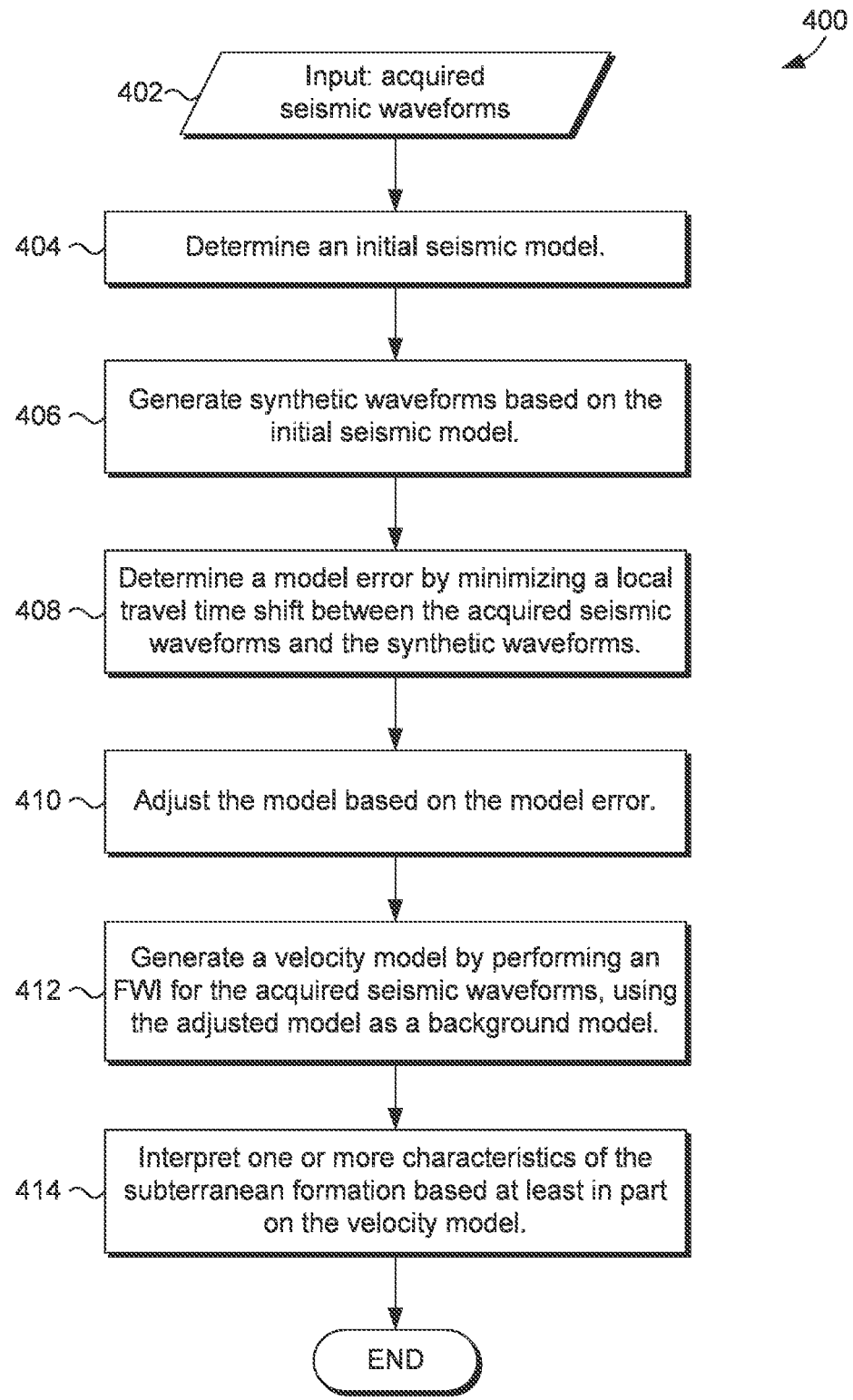
FIG. 4 illustrates a flowchart of a method for seismic processing, according to an embodiment.

FIG. 4 illustrates a flowchart of a method 400 for seismic processing, e.g., using a full waveform inversion, according to an embodiment. The method 400 may include obtaining seismic data, including a plurality of seismic waveforms, as at 402, e.g., as input. The seismic data may be acquired from one or more physical seismic acquisition devices, such as geophones, and may represent a physical subterranean formation, as generally described above. Further, the acquired seismic waveforms may be pre-processed, e.g., to remove noise therefrom, and/or any other suitable processing may be applied.

The method 400 may also include acquiring simulated inversion data, as at 404. The simulated inversion data may be calculated based on an initial model of the subterranean formation. For example, the model may be based on any available information about the subterranean formation that is known a priori, before the method 400 is conducted. This may include information about the subterranean formation, general characteristics of the seismic waveforms, etc.

The method 400 may further include determining a model error by minimizing a local travel time shift error between the acquired seismic waveforms and the synthetic waveforms, as at 408. Additional details regarding embodiments of such determining the model error are described below with reference to FIG. 5. Once the model error is determined, the method 400 may include adjusting the model based on the model error, as at 410. This may include, for example, adjusting the model such that the synthetic waveforms more closely match the acquired waveforms. In some embodiments, this may include time-shifting, phase-shifting, or in any other way, configuring the model such that the calculated, synthetic waveforms more closely match the acquired waveforms.

Once the model is adjusted, the method 400 may loop back to 408 in order to perform a subsequent determination at 408 and model adjustment at 410. Thus, the blocks 408 and 410 may be part of an iterative loop that may continue until the model is adjusted, for example, by less than a threshold amount, for a set number of iterations, or based on any other measure.

The method 400 may also include generating a velocity model by performing a full waveform inversion (FWI) for the acquired seismic waveforms, using the adjusted model (from the last iteration of 410) as the background model, as at 412. Any full waveform inversion technique may be applied; further, the full waveform inversion may be an iterative process.

The method 400 may then include interpreting one or more characteristics of the subterranean formation based at least in part on the velocity model, as at 414. In an embodiment, such interpretation may include identifying the location of seismic reflectors within the subterranean formation, which may be employed, e.g., after further processing, to determine the geology, lithology, etc. of the subterranean formation, e.g., to assist with oilfield development among other applications. In some embodiments, before, during, or after such interpreting, the method 400 may also include performing other types of inversion techniques to the data.

Referring again to performing the FWI at 412, FWI techniques may include time-domain algorithms, which may scale to large 3D problems. Performing the FWI at 412 may include iteratively building the velocity model by minimizing the misfit functional (equation (1)) that measures the difference between the acquired data and the simulated data, $$\min_{m \in M} J := \frac{1}{2} \sum_{s=1}^{N_s} \|F[m](x_r, t) - d_0(x_r, t; s)\|^2 \quad (1)$$

where J denotes the misfit functional, model m stands for a set of possible subsurface Earth models, data $d_0$ means the input observed data set, F[m] stands for full waveform simulator/forward map, which simulates data by solving wave equations with finite difference algorithm on a possible subsurface model m. This non-linear inverse problem may be solved by an iterative non-linear conjugate gradient approach with a line search globalization strategy, and the gradient can be computed with the following equation (2).

$$\nabla_m \mathcal{J} = \sum_{s=1}^{N_s} DF[m]^*(F[m](x_r, t) - d_0(x_r, t; x)) \quad (2)$$

where F[m] stands for the adjoint operator of the first derivative map of F[m], which may include backward propagation and an application of imaging condition.

Figure 5:
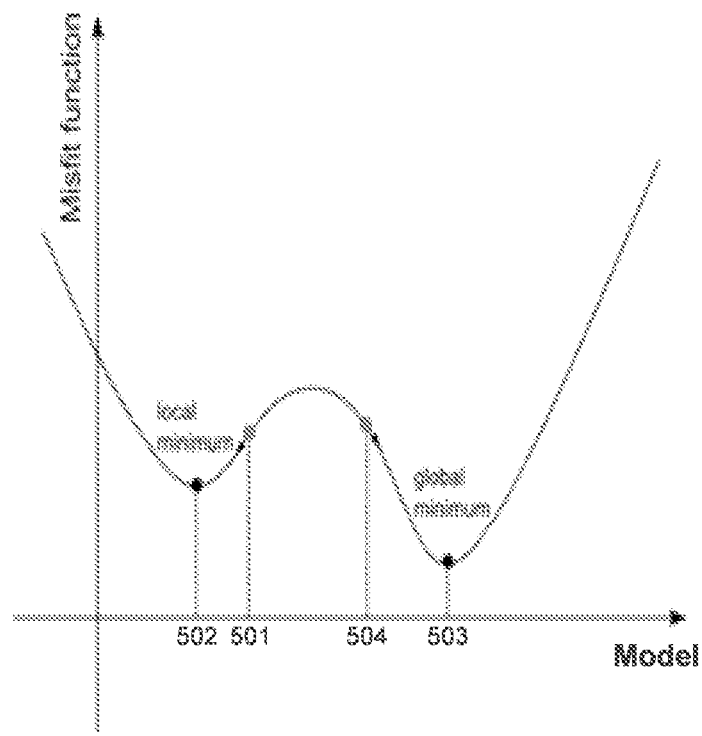
FIG. 5 illustrates minimizing misfit functions to a local minimum and a global minimum, according to an embodiment.

FWI may in general, however, be an ill-posed nonlinear inverse problem, e.g. because of nonlinearity in the relation between acquired data and model, the degree of freedom, and imperfection of acquired data. Accordingly, there may be more than one model that, when an FWI is applied, may generate data within certain data-fitting tolerances, as FIG. 5 shows. If FWI starts with the initial model 501, it will converge to the local minimum 502 on the left, instead of converging to the global minimum 503 on the right side. On the other hand, if FWI starts with the initial model 504, in the valley of the global minimum 503, the FWI process converges to the global minimum 503.

Figure 6:
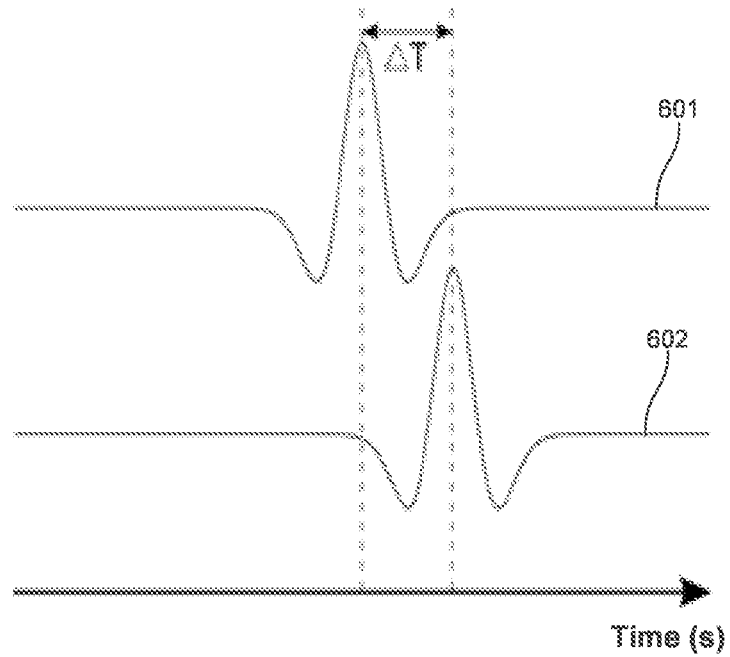
FIG. 6 illustrates a time-shift error in two signals, according to an embodiment.
Figure 7:
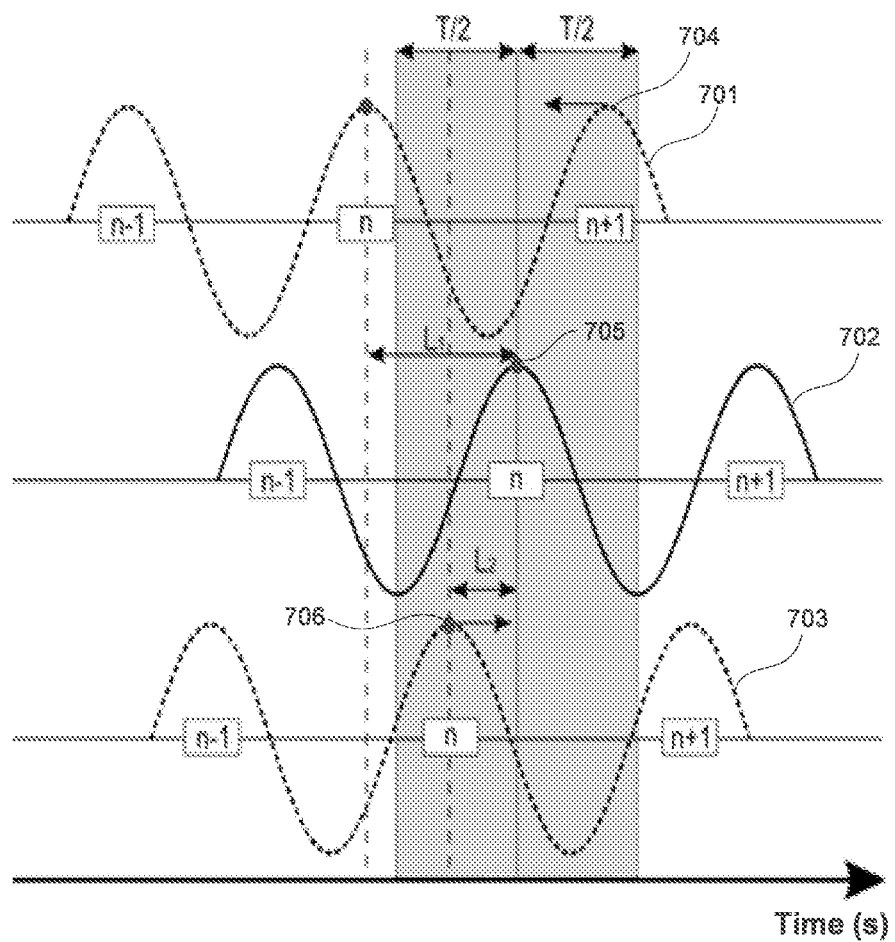
FIG. 7 illustrates a time shift error modification that either accurately shifts the signal or introduces a cycle-skipping error, according to an embodiment.

FIG. 6 illustrates a graph showing travel time shift ΔT as the mismatch between two signals 601, 602 in time, which may be relevant to cycle skipping determinations. FIG. 7 illustrates three sinusoidal signals 701, 702, 703 that are mismatched, according to an embodiment. Cycle skipping may occur in FWI when the mismatch/travel-time shift between synthetic/calculated data and the observed/acquired data is larger than the half period of the dominant frequency. As FIG. 7 shows, the mismatch between two sinusoidal signals, signal 701 (e.g., synthetic data) and signal 702 (e.g., observed data), $L_1$, is larger than T/2. T is the period of the sinusoidal signal. When cycle skipping happens, FWI may bring the inversion in the opposite and wrong direction, while the objective function reduces.

For instance, in FIG. 7, if FWI starts with the model that produces signal 701, it may move the calculated signal 701 in the left direction, which may result in the peak (n+1) 704 of the signal 701 being aligned with the peak (n) 705 of the signal 702. This movement may, however, result in the two signals 701, 702 being further misaligned, by a full period instead of between a half period and a full period. However, since the inversion makes two peaks 704, 705 align with each other, the misfit function (e.g., a mean-square difference) may still reduce, and thus converge to a local minimum, which may not be the global minimum. On the other hand, if FWI starts with another model that produces the synthetic/calculated signal 703, the mismatch of two signals $L_2$, is smaller than half period T/2. The inversion may align the peak (n) 706 of signal 703 with the peak (n) 704 of signal 702, and thus converge to the global minimum.

Figure 8:
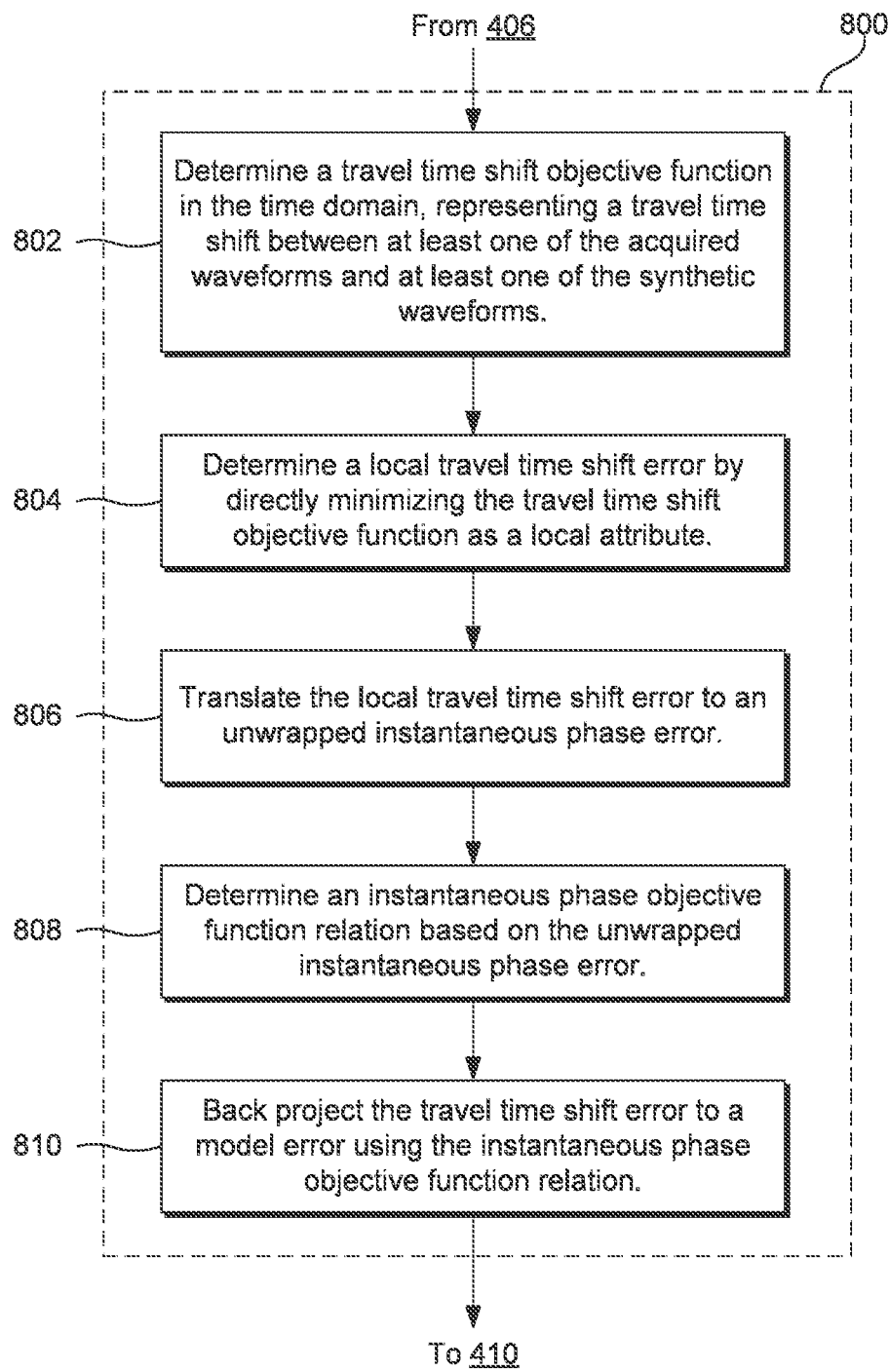
FIG. 8 illustrates a flowchart of a process for determining a model error, according to an embodiment.

To relax constraints on the starting model, while providing a greater likelihood of converging to the global minimum error in the FWI process, the method 400 provides the control block 408, as described above, in which the initial model (background model) may be determined by minimizing the time shift as a local attribute. Referring now to FIG. 8, there is illustrated a flowchart of an example of a process 800 for performing the determination at 408 in FIG. 4.

The process 800 may, for example, include determining a travel time shift objective function in the time domain, representing a travel time shift between at least one of the acquired waveforms and at least one of the synthetic waveforms, as at 802. The process 800 may then proceed to determining a local travel time shift error by directly minimizing the travel time shift objective function as a local attribute, as at 804.

For example, FWI may be modified to directly minimize travel time shift (equation (3)) between observed (acquired) and calculated (synthetic) data. This may be done instead of direct subtraction of the two, or by building an intermediate function or decomposing model spatially.

$$\min_{m \in M} J := \frac{1}{2} \sum_{s=1}^{N_s} \|\Delta T\|^2 \quad (3)$$

In the frequency domain, the travel time shift ΔT between two signals may be proportional to the phase difference ΔØ of the signals ($d_0$ is the observed data, d is the calculated data, and ω is the frequency). Therefore, FWI may use a phase-based (e.g., phase-only) objective function to back project the phase error/difference into model error/perturbation. The gradient formulation of a phase-only objective function may be formulated as in the following equations (4):

$$\min_{m \in M} J_\phi := \frac{1}{2} \sum_{s=1}^{N_c} \|\Delta \phi(\omega)\|^2 \quad (4)$$

$$\nabla_m \mathcal{J}_\phi = \sum_{s=1}^{N_c} \frac{\partial d(\omega)^T}{\partial m} \text{Re}\left\{ F^{-1} \frac{-i\phi(\omega)}{d(\omega)} \right\}$$

However, phases may be wrapped, and without an appropriate unwrapping process, the wrapped phase differences may lead to cycle skipping as well. Noisy field data and acquisition realities may prevent, or at least impede, an accurate and robust phase unwrapping process to produce accurate unwrapped phase differences.

In time domain, the instantaneous phase difference may be computed, and used as an objective function in FWI, as shown in equations (5). However calculating instantaneous phase difference in time domain may be prone to cycle skipping and poor signal to noise ratio issues etc. Hence, the instantaneous phase objective function might not allow recovery of background and low wavenumber components of the models, and thus may not overcome the cycle skipping issue (e.g., in field data).

$$\min_{m \in M} J_{\phi(t)} := \frac{1}{2} \sum_{s=1}^{N_s} \|\Delta \phi(t)\|^2 \quad (5)$$

$$\nabla_m \mathcal{J}_{\phi(t)} = \sum_{s=1}^{N_s} DF[m]^* \left\{ \Delta\phi(t) \frac{\mathcal{H}[d(t)]}{E(t)^2} + \mathcal{H}\left[\frac{\Delta\phi(t)d(t)}{E(t)^2}\right] \right\}$$

where ΔØ(t) is the instantaneous phase error, which is a function of t, between observed data $d_0$(t) and calculated data d(t), H is the Hilbert transform operator, and E is the instantaneous amplitude operator.

The process 800 may thus include identifying the correct travel time shift in time domain as a local attribute, as at 802, which is a function of time t in equation (6). The travel time shift objective function may then be directly minimized, as at 804, yielding a local travel time shift error and as indicated in equation (6).

$$\min_{m \in M} J := \frac{1}{2} \sum_{s=1}^{N_s} \|\Delta T(t)\|^2 \quad (6)$$

This local travel time shift can then be translated into the corresponding unwrapped instantaneous phase error, as at 806. As a local attribute, such an instantaneous phase error describes the local phase misalignment. Thus, the process 800 may include determining an instantaneous phase objective function relation based on the unwrapped instantaneous phase error, as at 808. The process 800 may then include back projecting the local travel time shift error into a model error using the instantaneous phase objective function relation, as shown in the gradient equation (7), as at 810:

$$\nabla_m \mathcal{J} = \sum_{s=1}^{N_s} DF[m]^* \left\{ \Delta T(t) \frac{\mathcal{H}[d(t)]}{E(t)^2} + \mathcal{H}\left[\frac{\Delta T(t)d(t)}{E(t)^2}\right] \right\} \quad (7)$$

where $\Delta T(t)$ is the local travel time shift, which is a function of t between observed data $d_o(t)$ and calculated data $d(t)$, H is the Hilbert transform operator, and E is the instantaneous amplitude operator.

FWI using the travel time shift objective function together with instantaneous phase relation may achieve successful inversion of the background/low wave-number components of the model, and may at least partially address the potential for cycle skipping. In addition, the field data testing shows this process 800 may result in better kinematic responses versus direct subtraction, phase-only objective function, and instantaneous phase objective function alone. As noted above, the process 800 may be iterative.

Figure 9A:
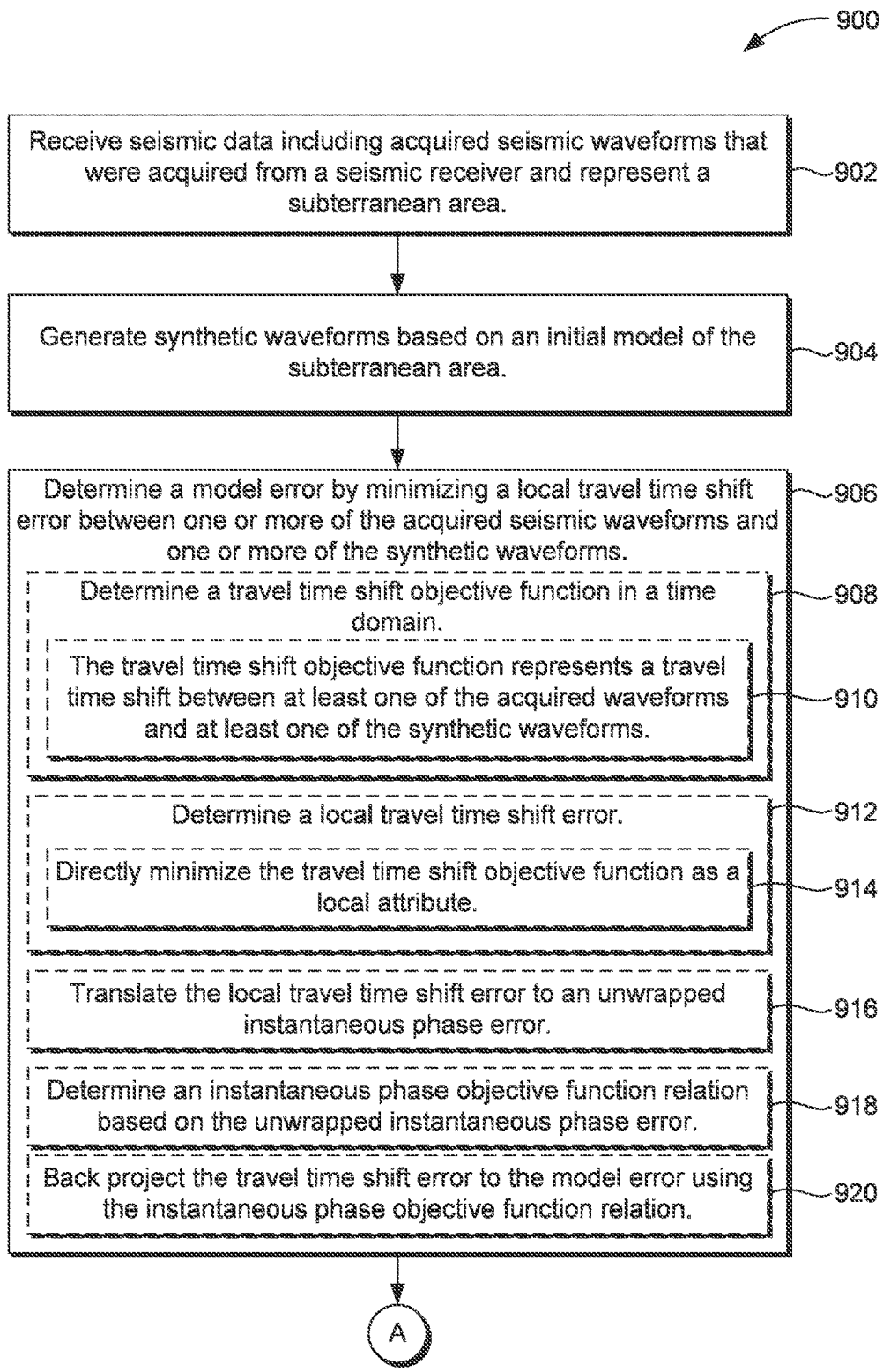
FIGS. 9A and 9B illustrate a flowchart of a method for seismic processing, according to an embodiment.
Figure 9B:
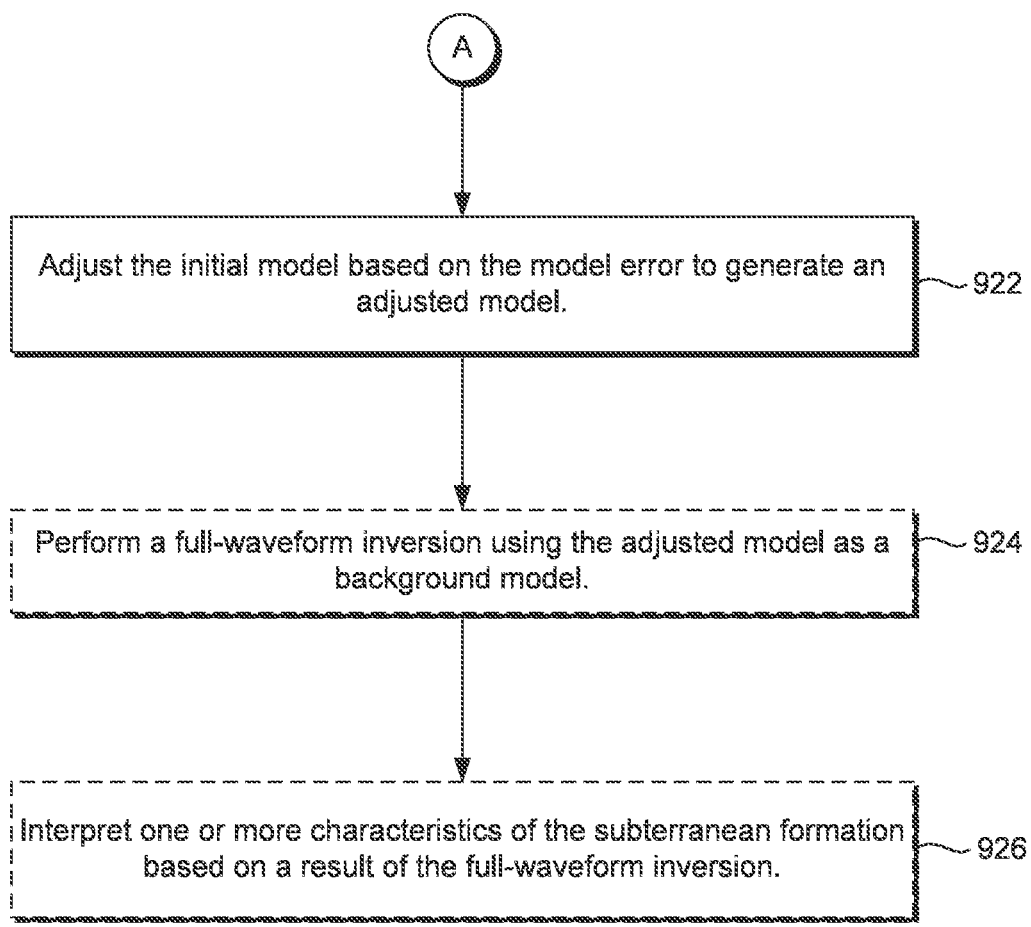

FIGS. 9A and 9B illustrates a flowchart of a method 900 for seismic processing, according to an embodiment. The method 900 may include receiving seismic data including acquired seismic waveforms that were acquired from a seismic receiver and represent a subterranean area, as at 902 (e.g., FIG. 4, 402). The method 900 may further include generating synthetic waveforms based on an initial model of the subterranean area, as at 904 (e.g., FIG. 4, 406).

The method 900 may also include determining a model error by minimizing a local travel time shift error between one or more of the acquired seismic waveforms and one or more of the synthetic waveforms, as at 906 (e.g., FIG. 4, 408: determine a model error by minimizing travel time shift; FIG. 8, process 800).

In an embodiment, determining at 906 may include determining a travel time shift objective function in a time domain, as at 908 (e.g., FIG. 8, 802). In an embodiment, determining the travel time shift objective function represents a travel time shift between at least one of the acquired waveforms and at least one of the synthetic waveforms, as indicated at 910 (e.g., FIG. 8, 802). In an embodiment, determining the model error at 906 may also include determining a local travel time shift error, as at 912 (e.g., FIG. 8, 804). Determining the local travel time shift error may include directly minimizing the travel time shift objective function as a local attribute, as at 914 (e.g., FIG. 8, 804). Determining the model error at 906 may further include translating the local travel time shift error to an unwrapped instantaneous phase error, as at 916 (e.g., FIG. 8, 806). Determining the model error at 906 may further include back projecting the travel time shift error to the model error using the instantaneous phase objective function relation, as at 920 (e.g., FIG. 8, 810).

The method 900 may additionally include adjusting the initial model based on the model error to generate an adjusted model, as at 922 (e.g., FIG. 4, 410). The method 900 may further include performing a full-waveform inversion using the adjusted model as a background model, as at 924 (e.g., FIG. 4, 412). In an embodiment, the method 900 may additionally include interpreting one or more characteristics of the subterranean formation based on a result of the full-waveform inversion, as at 926 (e.g., FIG. 4, 414).

Figure 10:
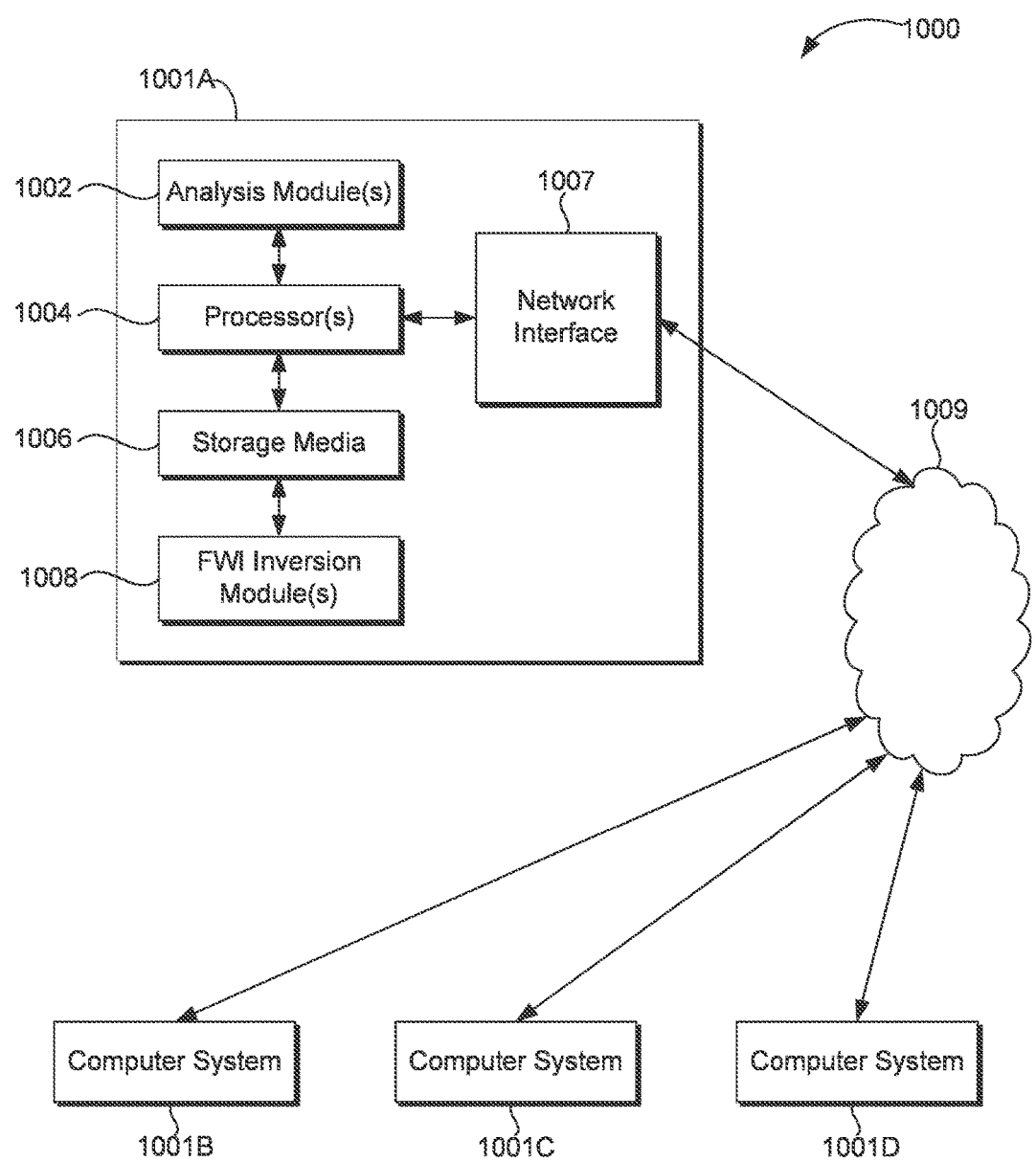
FIG. 10 illustrates a schematic view of a computing system, according to an embodiment.

In some embodiments, any of the methods described herein may be executed by a computing system. FIG. 10 illustrates an example of such a computing system 1000, in accordance with some embodiments. The computing system 1000 may include a computer or computer system 1001A, which may be an individual computer system 1001A or an arrangement of distributed computer systems. The computer system 1001A includes one or more analysis module(s) 1002 configured to perform various tasks according to some embodiments, such as one or more methods disclosed herein. To perform these various tasks, the analysis module 1002 executes independently, or in coordination with, one or more processors 1004, which is (or are) connected to one or more storage media 1006. The processor(s) 1004 is (or are) also connected to a network interface 10010 to allow the computer system 1001A to communicate over a data network 1009 with one or more additional computer systems and/or computing systems, such as 1001B, 1001C, and/or 1001D (note that computer systems 1001B, 1001C and/or 1001D may or may not share the same architecture as computer system 1001A, and may be located in different physical locations, e.g., computer systems 1001A and 1001B may be located in a processing facility, while in communication with one or more computer systems such as 1001C and/or 1001D that are located in one or more data centers, and/or located in varying countries on different continents).

A processor can include a microprocessor, microcontroller, processor module or subsystem, programmable integrated circuit, programmable gate array, or another control or computing device.

The storage media 1006 can be implemented as one or more computer-readable or machine-readable storage media. Note that while in the example embodiment of FIG. 10 storage media 1006 is depicted as within computer system 1001A, in some embodiments, storage media 1006 may be distributed within and/or across multiple internal and/or external enclosures of computing system 1001A and/or additional computing systems. Storage media 1006 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1000 contains one or more FWI inversion module(s) 1008, which may be configured to translate a travel-time shift error to an instantaneous phase error, according to an embodiment. In the example of computing system 1000, computer system 1001A includes the FWI inversion module 1008. In some embodiments, a single FWI inversion module may be used to perform some or all aspects of one or more embodiments of the methods described herein. In alternate embodiments, a plurality of FWI inversion modules may be used to perform some or all aspects of methods described herein.

It should be appreciated that computing system 1000 is only one example of a computing system, and that computing system 1000 may have more or fewer components than shown, may combine additional components not depicted in the example embodiment of FIG. 10, and/or computing system 1000 may have a different configuration or arrangement of the components depicted in FIG. 10. The various components shown in FIG. 10 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to methods discussed herein. This can include use of feedback loops executed on an algorithmic basis, such as at a computing device (e.g., computing system 1000, FIG. 10), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and/or described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method for seismic processing to generate a seismic image of a subterranean area using full-waveform inversion, comprising:
receiving seismic data comprising acquired seismic waveforms that were acquired from a seismic receiver and represent a subterranean area;
generating synthetic waveforms based on an initial model of the subterranean area;
determining a model error, wherein determining the model error comprises:
determining a travel time shift objective function;
determining a local travel time shift error by minimizing the travel time shift objective function;
determining an unwrapped instantaneous phase error based on the local travel time shift error;
determining an instantaneous phase objective function relation based on the unwrapped instantaneous phase error; and
determining the model error based on the local travel time shift error and the instantaneous phase objective function relation;
adjusting the initial model based on the model error to generate an adjusted model;
performing a full waveform inversion using the adjusted model to generate inverted data representing the subterranean area; and
generating a seismic image of the subterranean area using the inverted data.

2. The method of claim 1, wherein determining the model error comprises determining the travel time shift objective function in a time domain, wherein the travel time shift objective function represents a travel time shift between at least one of the acquired waveforms and at least one of the synthetic waveforms.

3. The method of claim 1, wherein determining the local travel time shift error comprises directly minimizing the travel time shift objective function as a local attribute.

4. The method of claim 1, wherein determining the model error further comprises translating the local travel time shift error to the unwrapped instantaneous phase error.

5. The method of claim 1, further comprising interpreting one or more characteristics of the subterranean area based on the inverted data from the full-waveform inversion.

6. A computing system for seismic processing to generate a seismic image of a subterranean area using full-waveform inversion, comprising:
one or more processors; and
a memory system comprising one or more non-transitory, computer-readable media storing instructions that, when executed by at least one of the one or more processors, cause the computing system to perform operations, the operations comprising:
receiving seismic data comprising acquired seismic waveforms that were acquired from a seismic receiver and represent a subterranean area;
generating synthetic waveforms based on an initial model of the subterranean area;
determining a model error, wherein determining the model error comprises:
determining a travel time shift objective function;
determining a local travel time shift error by minimizing the travel time shift objective function;
determining an unwrapped instantaneous phase error based on the local travel time shift error;
determining an instantaneous phase objective function relation based on the unwrapped instantaneous phase error; and
determining the model error based on the local travel time shift error and the instantaneous phase objective function relation;
adjusting the initial model based on the model error to generate an adjusted model;
performing a full waveform inversion using the adjusted model to generate inverted data representing the subterranean area; and
generating a seismic image of the subterranean area using the inverted data.

7. The system of claim 6, wherein determining the model error comprises determining the travel time shift objective function in a time domain, wherein the travel time shift objective function represents a travel time shift between at least one of the acquired waveforms and at least one of the synthetic waveforms.

8. The system of claim 6, wherein determining the local travel time shift error comprises directly minimizing the travel time shift objective function as a local attribute.

9. The system of claim 6, wherein determining the model error further comprises translating the local travel time shift error to the unwrapped instantaneous phase error.

10. The system of claim 6, wherein the operations further comprise interpreting one or more characteristics of the subterranean area based on the inverted data from the full-waveform inversion.

11. A non-transitory, computer-readable medium storing instructions that, when executed by at least one processor of a computing system, cause the computing system to perform operations for seismic processing to generate a seismic image of a subterranean area using full-waveform inversion, the operations comprising:

receiving seismic data comprising acquired seismic waveforms that were acquired from a seismic receiver and represent a subterranean area;

generating synthetic waveforms based on an initial model of the subterranean area;

determining a model error, wherein determining the model error comprises:

determining a travel time shift objective function;

determining a local travel time shift error by minimizing the travel time shift objective function;

determining an unwrapped instantaneous phase error based on the local travel time shift error;

determining an instantaneous phase objective function relation based on the unwrapped instantaneous phase error; and determining the model error based on the local travel time shift error and the instantaneous phase objective function relation;

adjusting the initial model based on the model error to generate an adjusted model;

performing a full waveform inversion using the adjusted model to generate inverted data representing the subterranean area; and generating a seismic image of the subterranean area using the inverted data.

12. The medium of claim 11, wherein determining the model error comprises:

determining the travel time shift objective function in a time domain, wherein the travel time shift objective function represents a travel time shift between at least one of the acquired waveforms and at least one of the synthetic waveforms;

determining the local travel time shift error by directly minimizing the travel time shift objective function as a local attribute; and translating the local travel time shift error to the unwrapped instantaneous phase error.

* * * * *